United States Patent [19]

Crivello et al.

[11] Patent Number: 5,247,044
[45] Date of Patent: Sep. 21, 1993

[54] SYNTHETIC METHOD FOR THE SYNTHESIS OF SILICON POLYETHER COPOLYMERS

[75] Inventors: James V. Crivello, Clifton Park; Mingxin Fan, Troy, both of N.Y.

[73] Assignee: General Electric Company, Waterford, N.Y.

[21] Appl. No.: 904,350

[22] Filed: Jun. 25, 1992

Related U.S. Application Data

[63] Continuation-in-part of Ser. No. 473,802, Feb. 2, 1990, Pat. No. 5,128,431, which is a continuation-in-part of Ser. No. 403,214, Sep. 1, 1989, abandoned.

[51] Int. Cl.$^5$ .............................................. C08G 77/06
[52] U.S. Cl. ....................................... 528/15; 528/27; 528/31
[58] Field of Search ...................... 528/15, 27, 31; 549/215; 556/446

[56] References Cited

U.S. PATENT DOCUMENTS

| | | | |
|---|---|---|---|
| 2,883,397 | 4/1959 | Bailey | 528/27 |
| 3,300,418 | 1/1967 | Andres et al. | 528/31 |
| 3,455,887 | 7/1969 | Plueddemann | 528/27 |
| 3,723,491 | 3/1973 | Rossmy et al. | 556/446 |
| 3,996,195 | 12/1976 | Sato et al. | 528/15 |
| 4,011,247 | 3/1977 | Sato et al. | 549/215 |
| 4,051,053 | 9/1977 | Elliott et al. | 556/446 |
| 4,083,856 | 4/1978 | Mendicino | 528/27 |
| 4,279,717 | 7/1981 | Eckberg et al. | 204/159.13 |
| 4,578,116 | 3/1986 | Rott et al. | 556/446 |
| 4,617,238 | 10/1986 | Crivello et al. | 428/452 |
| 4,666,745 | 5/1987 | Huhn et al. | 427/393.4 |
| 4,822,687 | 8/1989 | Kessel et al. | 428/447 |
| 4,912,188 | 3/1990 | Colas et al. | 528/15 |
| 5,128,431 | 7/1992 | Riding et al. | 528/15 |

FOREIGN PATENT DOCUMENTS

| | | | |
|---|---|---|---|
| 2012012 | 3/1970 | France | 549/215 |
| 971309 | 9/1964 | United Kingdom | 556/446 |

OTHER PUBLICATIONS

Ivin et al., "Ring Opening Polymerization", *Elsevier Appl. Sci. Pub.*, vol. 1, p. 185, New York (1984).
May et al.; *Epoxy Resins Chemistry and Technology*, Marcel Dekker, Inc., p. 283, New York, (1973).
Plueddemann, E. P. et al., "Epoxyorganosiloxanes", *J. of American Chemical Society*, vol. 81, pp. 2632-2635, (1959).
Aylett, *Organometallic Compounds*, John Wiley & Sons, p. 107, New York (1979).

*Primary Examiner*—Ralph H. Dean, Jr.

[57] ABSTRACT

The present invention is based on the discovery that various metal catalysts will catalyze the ring opening polymerization of epoxides to yield polyethers. The present invention therefore provides a method of making a polymeric product by ring-opening polymerization of heterocyclic epoxide monomer including the steps of preparing a mixture comprised of a catalyst; a Si—H containing compound; and at least one compound which is a heterocyclic epoxide containing monomer; and reacting the mixture at a temperature effective to promote ring-opening polymerization of the at least one compound to produce a polymeric product, preferably at room temperature.

The present invention additionally provides for the silicone-polyether compositions created by this method.

8 Claims, No Drawings

SYNTHETIC METHOD FOR THE SYNTHESIS OF SILICON POLYETHER COPOLYMERS

CROSS REFERENCE TO RELATED APPLICATIONS

This application is a continuation-in-part of application Ser. No. 07/473,802, filed Feb. 2, 1990, now U.S. Pat. No. 5,128,431 which is a continuation-in-part of application Ser. No. 403,214, filed Sep. 1, 1989, now abandoned both of which are incorporated herein by reference. This application is also related to our application entitled COBALT CATALYSTS FOR RING-OPENING POLYMERIZATION OF EPOXIDES AND OTHER HETEROCYCLES Ser. No. 07/934,584 filed Aug. 24, 1992 which is incorporated by reference.

BACKGROUND OF THE INVENTION

1. Field of the Invention

The present invention relates to a method of synthesis of silicone-polyether copolymers. This method utilizes a catalyst which promotes ring-opening polymerization of a variety of heterocyclic, epoxide ring containing monomers at room temperature. The invention also relates to the silicone-polyether compositions.

2. Technology Review

Silicones have been used in cosmetic formulations for over 30 years. Silicone surfactants, especially silicone-polyether copolymers are widely used components in these cosmetic formulations. Until recently, the most important silicones used for these applications were poly(dimethylsiloxanes). Poly(dimethylsiloxane) emulsions when used in cosmetic preparations, improve the rub out of creams and lotions. They act as glossing agents in hair care products and give a silk-like feel to the skin. The main disadvantage of these poly(dimethylsiloxanes), especially those with higher molecular weights, is their poor compatibility with cosmetic oils. Further, since these compounds are hydrophobic, they cannot easily be used in aqueous formulations unless they are emulsified.

Silicone surfactants derived from poly(dimethylsiloxanes) display better compatibility with cosmetic oils and/or improved water solubility depending on the modifying groups that are attached to the poly(dimethylsiloxane) backbone. These materials have been traditionally prepared by the condensation of terminal functionalized silicones (poly(dimethylsiloxanes)) with similarly functionalized polyethers. Examples of such syntheses can be found in the following patents: U.S. Pat. No. 2,834,748; U.K. 892,819; U.K. 954,041; U.K. 107,156; U.S. Pat. No. 2,868,824; French 1,179,743; Belg. 603,552; Belg. 603,832; U.K. 1,038,348; U.K. 1,073,368; and Belg. 627,281.

Although the prior art includes many examples of preparing these materials by condensation reactions, there appear to be no citations in the literature describing the ring-opening polymerization of epoxide rings by catalysis used for this purpose.

Co-pending, commonly-assigned U.S. application No. 07/934,584 filed Aug. 24, 1992 discloses a cobalt-based catalyst which promotes ring-opening polymerization of a variety of heterocyclic epoxide ring-containing monomers and polymers.

Catalytic agents which have been used to catalyze the ring opening polymerization of various heterocyclic compounds, particularly epoxides, include acids, bases, and certain metal complexes such as, for example, organoboron compounds, $FeCl_3$, $ZnEt_2/H_2O$, $AlEt_3/H_2O$, and aluminoporphrins. Reference is made, for example, to Ivin and Saegusa, *Ring Opening Polymerization*, Vol. 1, Elsevier Appl. Sci. Pub., New York 1984, p. 185; and to May and Tanaka, *Epoxy Resins Chemistry and Technology*, Marcel Dekker, Inc., New York, 1973, p. 283.

Epoxy monomers may be polymerized by either UV radiation or heat. Polymerization by UV radiation involves the use of a photocatalyst that, when irradiated with UV light, forms an acid that catalyzes the epoxide. Such reactions are taught by Eckberg in U.S. Pat. No. 4,279,717 and Crivello in U.S. Pat. No. 4,617,238.

Polymerization by heat involves the simple step of heating the epoxy monomers to a temperature of 120° C. or greater, causing the oxirane rings to open and react. Specific reference is made to E. P. Plueddumann and G. Fanger, Epoxyorganosiloxanes, Journal of the American Chemical Society, vol. 81, pp. 2632-2635, 1959.

Platinum-containing catalysts are highly useful catalysts in hydrosilation reactions, i.e., the addition of Si—H containing compounds to olefin and acetylenic bonds. Reference is made to Aylett, *Organometallic Compounds*. Vol. 1, John Wiley, New York, 1979, p. 107 and to Speier, Adv. in Org. Chem., Vol. 17, p. 407, 1974. It is further known in the art that platinum catalysts will catalyze the hydrosilation reaction between ethylenically unsaturated organic epoxy monomers and Si—H containing compounds. Such reactions are described, for example, in copending, commonly assigned application Ser. No. 332,646, filed Apr. 3, 1989.

The use of platinum catalysts to promote ring opening of heterocyclic monomers provides numerous advantages over catalysts presently used in their polymerization. These advantages include the use of low levels of platinum catalysts and the low tendency of catalyst residues to induce color, oxidative instability in the final cured resin, or corrosion to metals in contact with the resin. Furthermore, with silicones, the platinum catalysts are less prone to cause reversion of the silicone polymers to cyclic siloxanes.

Dicobaltoctacarbonyl, $Co_2(CO)_8$, has been widely used as a catalyst for the hydrogenation of olefins, for which reference is made to (a) Major, Horvath, and Pino, *J. Molecular Catalysis*, 1988, 45, 275, (b) Ungvary and Marko, *J. Organometal. Chem.*, 1981, 219, 397, (c) Ungvary and Marko, *Organometallics*, 1982, 1, 1120, and (d) Wender, Levine and Orchin, *J. Am. Chem. Soc.*, 1950, 72, 4375; the hydroformulation of olefins, for which reference is made to (a) Wender, Sternberg and Orchin, *J. Am. Chem. Soc.*, 1953, 75, 3041, and (b) Orchin, Kirch and Goldfarb, *J. Am. Chem. Soc.*, 1956, 78, 5450; and the hydrosilation of olefins, for which reference is made to (a) Hilal, Abu-Eid, Al-Subu and Khalaf, *J. Molecular Catalysts*, 1987, 39, 1, (b) Harrod and Chalk, *J. Am. Chem. Soc.*, 1965, 87, 1133, (c) Chalk and Harrod, *J. Am. Chem. Soc.*, 1967, 89, 1640, and (e) Baay and MacDiarmid, *Inorg. Chem.*, 1969, 8, 986. In addition, there is one report in the literature describing the catalysis by $Co_2(CO)_8$ of the ring-opening polymerization of a heterocyclic compound (Chalk, *J. Chem. Soc., Chem. Commun.*, 1970, 847). Chalk has reported that when $Co_2(CO)_8$ was used as a hydrosilation catalyst employing tetrahydrofuran as a solvent, poly(tetramethylene oxide) resulting from the ring-opening of the THF was isolated.

Harrod and Smith similarly observed that THF could be ring-opened under hydrosilation conditions using iridium-containing catalysts (Harrod and Smith, J. Am. Chem. Soc., 1970, 90, 2699). However, polymerization was not observed and only the olefin derived from transfer of the trialkylsilyl group to the oxygen of THF followed by ring opening and elimination, was obtained.

In addition, $Co_2(CO)_8$-mediated ring-opening reactions of carbon monoxide with epoxides and other heterocyclic compounds has recently been studied, regarding which reference is made to (a) Alper, Arzoumanian, Petrinani and Saldana-Maldonado, *J. Chem. Soc., Chem. Commun.*, 1985, 340, (b) Alper and Calet, *Tetrahedron Letters*, 1985, 26. 5735, (f) Seki, Hidaka, Murai and Sonoda, *Angew. Chem.*, 1977, 89, 196, (g) Murai and Sonoda, *Angew. Chem.*, 1979, 18, 837, (h) Murai, Hatayama, Murai and Sonoda, *Organometallics*, 1983, 2, 1883, (i) Chatani, Fujii, Yamasaki, Murai and Sonoda, *J. Am. Chem. Soc.*, 1986, 108, 7361, (j) Murai, Kato, Murai, Hatayama and Sonoda, *Tetrahedron Letters*, 1985, 26, 2683, and (k) Murai et al., *J. Am. Chem. Soc.*, 1989, 111, 7938. These reactions require high pressure and high temperatures, and polymerization was not observed in any of these studies.

SUMMARY OF THE INVENTION

The present invention is based on the discovery that various metal catalysts will catalyze the ring opening polymerization of epoxides to yield polyethers. The present invention therefore provides a method of making a polymeric product by ring-opening polymerization of heterocyclic epoxide monomer or polymer including the steps of preparing a mixture comprised of a catalyst; a Si—H containing compound; and at least one compound which is a heterocyclic epoxide containing monomer; and reacting the mixture at a temperature effective to promote ring-opening polymerization of the at least one compound to produce a polymeric product, preferably at room temperature.

The present invention additionally provides for the silicone-polyethers produced by this method.

DETAILED DESCRIPTION OF THE INVENTION

The present invention therefore provides a method of making and the composition of a polymeric product by ring-opening polymerization of heterocyclic epoxide containing:

(A) an epoxide compound;
(B) a Si—H functional silicon compound(s); and
(C) a metal catalyst.

Component (A) can consist of a wide variety of heterocyclic epoxide monomers which can be polymerized using the catalyst/cocatalyst mixture. Preferably, the heterocyclic epoxide compounds (A) are selected from a group including the following:

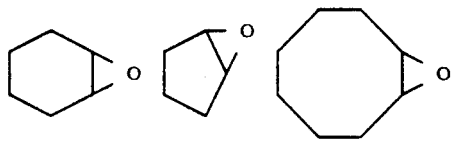

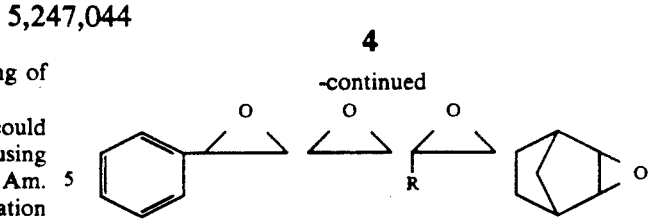

where R is defined in the above structures as consisting of alkyl, haloalkyl, cyanoalkyl, nitroalkyl, aromatic, cycloaliphatic and heterocyclic groups.

Component (A) does not include oxetane. Oxetane is trimethylene oxide, it is one kind of epoxy group.

In the preferred embodiment of the present invention, the heterocyclic epoxide compound is cyclohexene oxide.

Component (A) is used in the method and composition of the present invention in an amount ranging from about 0.5 to about 100 parts by weight of the composition, preferably from about 1 to about 50 parts by weight of the composition, and most preferably from about to about 10 parts by weight of the composition.

Component (B), the silicon hydride-containing starting materials suitable for making the epoxy functionality include any silicon compound derived from at least two organosiloxane units and having terminal and/or pendant Si—H groups. Examples of suitable Si—H functional silicone compounds include 1,1,3,3-tetraalkyldisiloxane,dialkylhydrogensiloxy-endstopped polydialkylsiloxane, polydialkylsiloxane-alkylhydrogensiloxane copolymer, and trialkylsiloxy-endstopped polydialkylsiloxane-alkylhydrogensiloxane copolymer comprising at least two alkylhydrogen siloxy groups. Other examples of Si—H containing silicon compounds include 1,1,3,3-tetramethyldisiloxane; 2,4,6,8-tetramethylcyclotetrasiloxane; poly(methylhydrogensilane); poly(dimethysiloxane); copolymers of poly(methyhydrosiloxane) and poly(dimethylsiloxane); tetrakis(dimethylsiloxy)silane; 1,1,2,2- tetramethyldisilane; tris(dimethylsiloxy)silane; and hydrogen terminated poly(dimethylsiloxanes). The preferred Si—H functional silicon compound as a starting material for making the epoxy functional silicone used in the present invention is polydialkysiloxane-alkylhydrogensiloxane copolymer and poly(dimethylsiloxane-methylhydrogensiloxane) copolymer.

During the hydrosilation reaction it is common to find residual amounts of Si—H functional siloxane left after the reaction has ceased. This residual Si—H functional siloxane may be used as component (B) in the composition of the present invention. Also, additional Si—H functional siloxane may be added to increase reaction rates. Although the Si—H functional material may be a silane, it is most advantageous to use an Si—H functional polysiloxane linear polymer.

Thus, one embodiment of the present invention utilizes as Component (B) a Si—H functional linear polysiloxane polymer represented by the formula:

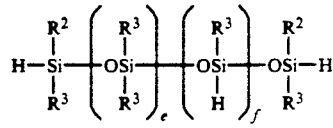

wherein $R^2$ is a monovalent hydrocarbon radical; $R^3$ is selected from the class consisting of monovalent hydrocarbon or fluorocarbon or cyanoalkyl radicals; "e" varies from 1 to about 1,000; and "f" varies from about 5 to about 200. More preferably, "e": varies from about 10 to about 500 and "f" varies from about 5 to about 200. Such a polymer is taught by Jeram et al. in U.S. Pat. No. 3,884,866; Lee et al. in U.S. Pat. No. 4,162,243; and Sweet in U.S. Pat. No. 4,427,801; hereby incorporated by reference.

Another embodiment of the present invention utilizes cyclic silicone hydrides as Component (B). Such cyclic silicone hydrides are well known in the art and may be represented by the formula:

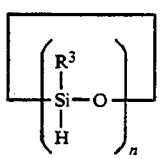

wherein $R^3$ is as previously defined and "n" is from about 2 to about 12.

Such cyclic silicone hydrides are disclosed in U.S. Pat. No. 4,743,377 (Ohtsu et al.), herein incorporated by reference.

Component (B) is used in the method and composition of the present invention in an amount ranging from about 0.1 to about 1000 parts by weight of the composition, preferably from about 0.5 to about 600 parts by weight of the composition, and most preferably from about 0.5 to about 400 parts by weight of the composition.

Precious metal catalysts are well known in the art and Component (C) may be selected from the group of precious metal complexes which include complexes of ruthenium, rhodium, palladium, osmium, iridium and platinum.

The catalyst of Component (C) which may be used to effect the final cure of the heterocyclic polymers and residual silicon hydrides may be any suitable platinum catalyst. Such catalysts are well known in the art. Examples of suitable catalysts are taught by Lamoreaux in U.S. Pat. Nos. 3,917,432; 3,197,433; and 3,220,972; and by Karstedt in U.S. Pat. Nos. 3,715,334 and 3,184,730; and by Ashby et al. in U.S. Pat. No. 4,288,345; hereby incorporated by reference. The preferred catalysts are those described in the Lamoreaux and Karstedt patents. The catalyst described in the patents to Lamoreaux is a complex formed from chloroplatinic acid with up to 2 moles per gram of platinum of a member selected from the class consisting of alcohols, ethers, aldehydes and mixtures of the above.

The platinum catalyst disclosed in the patent to Karstedt, U.S. Pat. No. 3,814,730 is a platinum-siloxane complex containing less than about 0.1 gram atom of halogen per gram atom of platinum. It is prepared by reacting a platinum halide, preferably chloroplatinic acid, and an unsaturated siloxane, preferably sym-tetramethyldivinyldisiloxane, and is sometimes referred to herein as "Karstedt's catalyst".

Other metal catalysts which may be employed in this invention include but are not restricted to $[RhCl(COD)]_2$, $[RhCl(C_2H_4)_2]_2$, $[RhCl(NBD)]_2$, $[RhCl(CO)_2]_2$, $[IrCl(COD)]_2$ and $Co_2(CO)_8$ wherein COD represents cyclooctal,5diene and NBD represents norbornadine.

The preferred catalyst to be used for Component (C) is Ashby Catalyst.

In the method and composition of the present invention the catalysts (C) are most useful and economical in the range of from about 0.5 to about 10,000 parts per million of the weight of the composition of pure catalyst, preferably from about 1 to about 5000 parts per million of the weight of the composition, and most preferably from about 1 to about 1000 parts per million of the weight of the composition, based upon the weight of the composition consisting of Components (A), (B) and (C).

It is to be understood that amounts greater than 10,000 parts per million are also effective but are unnecessary and wasteful, especially when the preferred catalyst is used.

The process for producing a platinum-catalyzed heterocyclic organic polymer composition involves mixing at least one heterocyclic epoxide organic monomer, a Si—H functional silicon compound, and a metal catalyst. Best results are obtained at a temperature from about 0° C. to about 175° C., and preferably from about 25° C. to about 120° C.

Using this general approach, it is possible to prepare a wide variety of silicone-polyether copolymers with different structures and using a wide range of epoxides and Si—H functional siloxanes as substrates. The reaction between Components (A), (B) and (C) of the present invention yields the following structural examples of the silicone-polyethers. These examples are given by way of illustration and not by way of limitation,

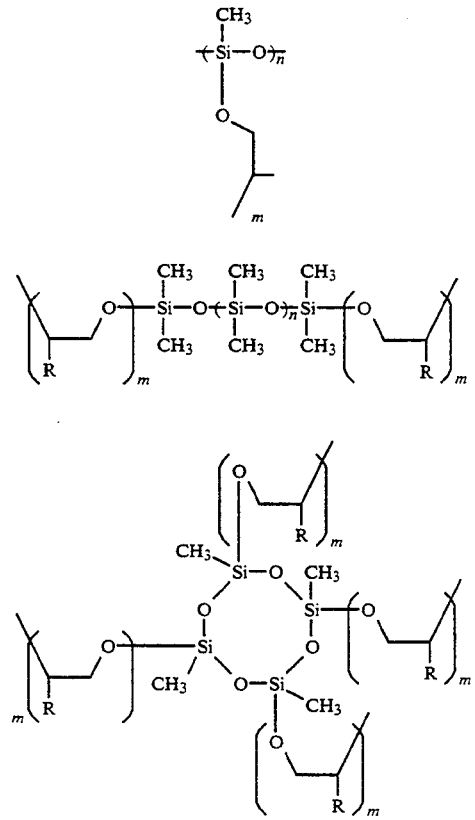

-continued

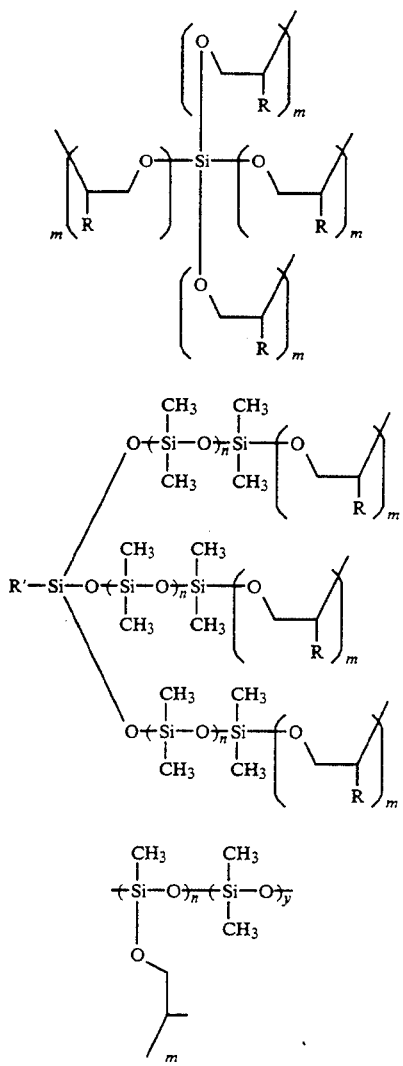

In the above structures, R' may be alkyl, haloalkyl, cyanoalkyl, or aryl.

The composition and method of the present invention are useful for a wide diversity of applications. Among these include cosmetic uses, floor and automotive polishes, lubricants, mold releases, paper releases, emulsifying agents, and viscosity additives. In the course of these applications, the polymers may be modified by the addition of fillers, coloring agents, and wetting agents. Two component curing systems may be designed in which the heterocyclic polymer (A) is first mixed with a catalytic amount of an active metal catalyst (C), then on addition of the Si—H functional silicon compound which is component (B), the cure takes place.

In order that persons skilled in the art may better understand the practice of the present invention, the following examples are provided by way of illustration, and not by way of limitation. Additional information which may be useful in state-of-the-art practice may be found in each of the references and patents cited herein, which are hereby incorporated by reference.

EXAMPLES

Example 1

Synthesis of a Graft Copolymer

There were mixed together in a small beaker, 12.0 g of cyclohexene oxide, 2.0 g poly(methylhydrogen siloxane) (M.W.—1500). Then 10 drops of the Ashby catalyst (1.75% Pt in ethanol) were added and vigorously mixed. Very fast reaction took place after a two minute induction period. A partially crosslinked foamed polymer was obtained in 90% yield. The polymer was found to be 60% soluble in toluene.

The above reaction was repeated using 50 ml dry toluene as the solvent. In this case, no crosslinking was observed and the polymer was isolated by adding methanol to the polymer solution. The polymer was found by gel permeation chromatography to have a number average molecular weight of 27,430 g/mole and a weight average molecular weight of 111,280 g/mole. The polymer was further characterized by $^1H$, $^{13}C$ and $^{29}Si$ NMR spectroscopy. In accordance with these analyses, the product is a graft polymer having the following structure.

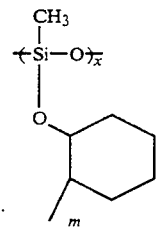

Graft Polymer Degradation

The graft polymer prepared as described above was further characterized by acid catalyzed degradation. Under acidic conditions the poly(siloxane) bonds of the backbone were cleaved and the molecular weight of the remaining polyether grafts determined. There were dissolved in 10 ml of dry $CH_2Cl_2$ 1.0 g of the graft polymer described above, 1.0 g hexamethyldisiloxane and 10 drops of trifluoromethanesulfonic acid. The resulting mixture was stirred at room temperature for two days. The final solution was analyzed by gel permeation chromatography which gave a number average molecular weight of 891 g/mole and a weight average molecular weight of 1330 g/mole for the poly(cyclohexene oxide) grafts.

Example 2

There were mixed together in 50 ml of $CH_2Cl_2$ 2.0 g of a 50:50 random copolymer containing dimethylsiloxane and methylhydrogensiloxane repeat units and 12 g cyclohexene oxide. To this mixture there were added 20 drops of the Ashby catalyst. Polymerization was allowed to proceed for 12 hours at room temperature. The final graft polymer had a $M_n = 4460$ g/mole and a $M_w = 12,780$ g/mole.

Example 3

In a manner similar to example 2, there were mixed together 2.0 g 2,4,6,8-tetramethylcyclotetrasiloxane, 12.0 g of cyclohexene oxide, 50 ml of $CH_2Cl_2$ and 10 drops of the Ashby Catalyst. A four arm star poly(cyclohexene oxide) was obtained having a $M_n = 15,270$ g/mole and a $M_w = 43,760$ g/mole.

Example 4

In a manner similar to example 2, there were mixed together 2.0 g methyltris(dimethylsiloxy)siloxane, 12.0 g of cyclohexene oxide, 50 ml of $CH_2Cl_2$ and 10 drops of the Ashby Catalyst. A three arm star poly(cyclohexene oxide) was obtained having a $M_n = 4615$ g/mole and a $M_w = 11,980$ g/mole.

Example 5

In a manner similar to example 2, there were mixed together 1.0 g phenyltris(dimethylsiloxy)siloxane, 12.0 g of cyclohexene oxide, 50 ml of $CH_2Cl_2$ and 10 drops of the Ashby Catalyst. A three arm star poly(cyclohexene oxide) was obtained having a $M_n = 5480$ g/mole and a $M_w = 15,210$ g/mole.

Example 6

In a manner similar to example 2, there were mixed together 1.0 g tetrakis(dimethylsiloxy)siloxane, 12.0 g of cyclohexene oxide, 50 ml of $CH_2Cl_2$ and 10 drops of the Ashby Catalyst. A four arm star poly(cyclohexene oxide) was obtained having a $M_n = 14,420$ g/mole and a $M_w = 30,860$ g/mole.

Example 7

In a manner similar to example 2, there were mixed together 5.0 g an α,ω-hydrogen functional poly(dimethysiloxane) having a molecular weight of 3180 g/mole, 12.0 g of cyclohexene oxide, 50 ml of $CH_2Cl_2$ and 10 drops of the Ashby Catalyst. The mixture was heated at 90° C. for 10 minutes. A partialy crosslinked block poly(dimethylsiloxane)- poly(cyclohexene oxide) was obtained. The soluble polymer had a $M_n = 7140$ g/mole and a $M_w = 16,120$ g/mole.

Example 8

There were combined in a beaker, 12.0 g of cyclohexene oxide, 2.0 g of poly(methylhydrogen siloxane) ($M_n = -1,500$ g/mole) and 2 mg $[RhCl(COD)]_2$. The reaction color changed from clear yellow and gas evolution was observed. Very fast reaction took place after a 30 second induction period. The polymer was isolated after 2 hours by dissolving the reaction mixture in chloroform. The solution was filtered to remove the insoluble crosslinked polymer and the soluble polymer fraction precipitated into methanol. There were obtained 8 g of soluble graft polymer having a $M_n = 10,780$ g/mole and a $M_w = 27,440$ g/mole.

Example 9

To 10.0 g of cyclohexene oxide, 3.0 g of poly(methylhydrogen siloxane) ($M_n = 1,500$ g/mole) there were added 5 mg $Co_2(CO)_8$. The initial yellow solution turned to brown as reaction took place rapidly after a 1 minute induction period. The polymer was isolated after 2 hours by dissolving the reaction mixture in chloroform. The solution was filtered to remove the insoluble crosslinked polymer and the polymer recovered by precipitation into methanol. There were obtained 8 g of soluble graft polymer having a $M_n = 19,680$ g/mole and a $M_w = 62,590$ g/mole.

It is understood that various other modifications will be apparent to and can be readily; made by those skilled in the art without departing from the scope and spirit of the present invention. Accordingly, it is not intended that the scope of the claims appended hereto be limited to the description set forth above but rather that the claims be construed as encompassing all features of patentable novelty which reside in the present invention, including all features which would be treated as equivalents thereof by those skilled in the art to which the invention pertains.

What is claimed is:

1. A curable composition comprising:
   (A) epoxide compound selected from a group consisting of

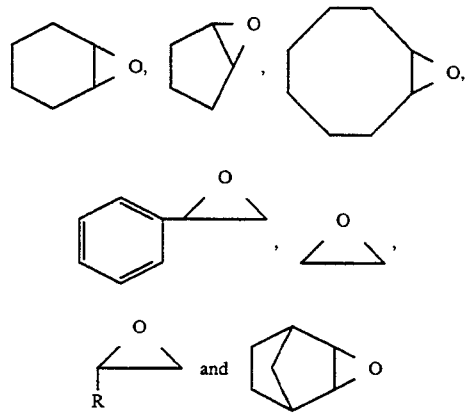

where R is a alkyl, haloalyl, cyanoalkyl, nitroalkyl, aromatic, cycloaliphatic or heterocyclic;
   (B) a Si—H functional silicon compound(s); and
   (C) a metal catalyst which is a complex of a precious metal selected from the group consisting of ruthenium, rhodium, palladium, osmium, iridium and platinum.

2. The composition of claim 1, wherein the heterocyclic epoxide compound is cyclohexene oxide.

3. The composition of claim 1 wherein the Si—H functional silicon compound is an Si—H functional linear polysiloxane represented by the formula:

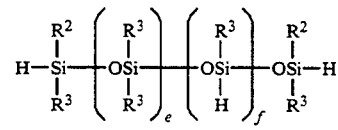

wherein $R^2$ is selected from the group consisting of hydrogen and monovalent hydrocarbon radicals; $R^3$ is a monovalent hydrocarbon radical; "e" varies from 1 to about 1000; and "f" varies from about 5 to about 200.

4. The composition of claim 1 wherein the Si—H functional silicon compound is selected from the group consisting of 1,1,3,3-tetramethyldisiloxane; 2,4,6,8-tetramethylcyclotetrasiloxane; poly(methylhydrogensilane); poly(dimethysiloxane); copolymers of poly(methyhydrosiloxane) and poly(dimethylsiloxane); tetrakis(dimethylsiloxy)silane; 1,1,2,2-tetramethyldisilane; tris(dimethylsiloxy)silane; and hydrogen terminated poly(dimethylsiloxanes).

5. The composition of claim 1 wherein the catalyst is selected from a group consisting of $[RhCl(COD)]_2$, $[RhCl(C_2H_4)_2]_2$, $[RhCl(NBD)]_2$, $[RhCl(CO)]_2$, $[IrCl(COD)]_2$ and $Co_2(CO)_8$ wherein COD represents cyclooctal,5diene and NBD represents norbornadine.

6. The composition of claim 1 wherein the catalyst is a complex with up to 2 moles per gram of platinum formed from chloroplatinic acid and a member selected from the group consisting of alcohols, ethers, aldehydes and mixtures thereof.

7. The composition of claim 1 wherein the catalyst is a platinum-siloxane complex containing less than about 0.1 gram atom of halogen per gram atom of platinum.

8. A method for preparing a silicone-polyether consisting of the steps:
(i) mixing Components (A), (B) and (C) of claim 1; and
(ii) holding the mixture at a temperature from about 25° C. to about 120° C. for a suitable period of time.

* * * * *